United States Patent Office 3,388,197
Patented June 11, 1968

3,388,197
STRETCHED TUBULAR FILM
Bruce Samways, Cedar Point, Sea Walls Road,
Bristol, England
Filed Apr. 1, 1965, Ser. No. 444,606
Claims priority, application Great Britain, Apr. 4, 1964,
13,989/64
16 Claims. (Cl. 264—89)

ABSTRACT OF THE DISCLOSURE

This invention relates to the production of a stretched oriented tubular film of an orientable polymeric material by extruding a film-forming composition capable of forming a film of the polymeric material on setting, through a tube-shaping die while in the unset condition into a bath of setting liquid to form a tube. The tube is drawn upwardly through the setting liquid by a drawing means and is set to a stretch-orientable state within the bath in a region disposed above the die. A gaseous medium is maintained under pressure within the tube passing through the bath at a pressure sufficient to inflate and stretch the tube while it is undergoing setting and to inflate and stretch the tube in the stretch-orientable state. The setting liquid in the bath is maintained at such a level that the effective inflating pressure, being the differential pressure between the internal pressure exerted within the tube by the gaseous medium and the external pressure exerted by the setting liquid, acting upon the tube in the freshly extruded unset state is insufficient to rupture the tube.

---

Figure 1:
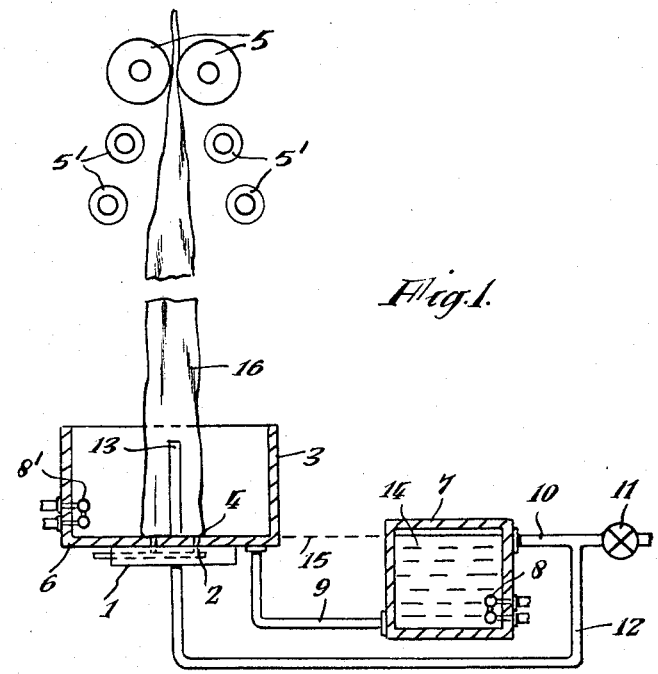

In the manufacture of tubular films from thermoplastic polymeric materials such as polyethylene, it is well-known to inflate a freshly extruded tube of the material while it is in a plastic molten state by maintaining a bubble of air under pressure within the tube between the extrusion die and a point at which the travelling tube, cooled to a non-molten state, is collapsed between a pair of nip rollers. On inflation of the tube, the tube wall in the region where the thermoplastic material is in the plastic state stretches and thins the tube wall to a desired thickness. This stretching step is sometimes known in the art as the "primary blow."

It is also known that the physical properties, such as tensile strength, of certain thermoplastic polymer films, for example polypropylene films, are enhanced if the film is stretched in one or more directions while the film is held at a temperature lying in a range between about 2° C. below the melting point or softening point of the particular thermoplastic polymeric material and its second order transition temperature. Under these conditions, the molecular structure of the film becomes, at least partially, oriented in the direction of the applied stretching force.

If the film is in the form of a tube, it may conveniently be stretched and at least partially oriented in one or two directions substantially at right-angles to each other, known as biaxial orientation, by introducing a gaseous medium, such as air, under pressure into the tube to inflate and expand the tube while the tube is held within the appropriate temperature range. This stretching step is sometimes known as the "secondary blow."

Owing to the thermoplastic material forming the tube being in a substantially non-molten, non-plastic state during the stretching and orienting step, the pressures required for the secondary blow are considerably greater than those required for the primary blow. For this reason, it has hitherto not been possible to effect the thinning of the plastic tube wall as in the primary blow and stretching with orientation of the thinned non-plastic tube as in the secondary blow in one blowing operation, since the pressures required for the secondary blow would blow out and rupture the tube as it was extruded from the die orifice in the molten state.

Consequently, the secondary blow is usually conducted as a separate processing step in which the gaseous pressure applied to the interior of the tube is isolated from the freshly extruded portion of the tube.

By the method of the present invention, the primary and secondary blowing can be conducted consecutively in one processing step without isolation of the two steps by grading the effective pressure applied to the interior of the tube from a substantially low pressure in the region of the tube freshly extruded from the die and in a molten highly plastic state to a markedly higher pressure capable of stretching and orienting the tube wall in the region of the tube which is in a stretch-orientable state, that is when the tube has been cooled below the melting point or softening point but above the second order transition temperature of the thermoplastic polymeric material forming the tube. The term "softening point" is used in relation to those thermoplastic polymeric materials which have no sharp melting point, for example, polyvinyl chloride, and means the lowest temperature at which the materials when stretched show no increase in the property of tensile strength (measured at ambient temperatures). The method of the present invention may also be employed for stretching tubular films of materials other than thermoplastic polymeric materials.

Accordingly, the present invention includes a method for the production of a stretched oriented tubular film of an orientable polymeric material comprising extruding a film-forming composition capable of forming a film of the polymeric material on setting, through a tube-shaping die while in the unset state into a bath of setting liquid to form a tube, drawing the tube upwardly through the setting liquid by a drawing means, setting the tube to a stretch-orientable state within the bath in a region disposed above the die, maintaining a gaseous medium under pressure within at least the uppermost portion of the tube passing through the bath at a pressure sufficient to inflate and stretch the tube while it is undergoing setting and to inflate and stretch the tube in the stretch-orientable state and maintaining the setting liquid in the bath at such a level that the effective inflating pressure, being the differential pressure between the internal pressure exerted within the tube and the external pressure exerted by the setting liquid, acting upon the tube in the freshly extruded unset state is insufficient to rupture the tube.

By the expression "setting" when applied to the liquid film-forming composition is meant the transition of the liquid composition towards a fully coherent solid state. Thus, when the liquid film-forming composition is a thermoplastic polymeric material in a molten state, setting takes place when the material is cooled below its melting point or softening point. When the liquid film-forming composition is a coagulable material, setting takes place when the composition undergoes coagulation which may include a chemical change, and proceeds towards a coherent self-supporting material.

Preferably, the setting liquid in the bath is maintained at such a level that at the point of extrusion of the film-forming composition into the bath the pressure of the setting liquid upon the tube is substantially equal to the internal pressure within the tube.

The process in accordance with the invention is particularly useful for the production of biaxially oriented tubular films formed from thermoplastic polymeric materials such as polyethylene, polypropylene, polybutene-1, polyvinyl chloride, cellulose acetate, polyesters such as polyethylene terephthalate, and the like.

For example, in one form of the invention, a tube of a thermoplastic polymeric material is extruded upwardly through a bath of a cooling liquid to cool the material below its melting or softening point, a gaseous medium, for example air, at a pressure sufficient to inflate and stretch the cooled tube in its stretch-orientable state is maintained in the whole of the tube between the point of extrusion into the bath and the point of collapse of the tube at nip rollers placed above the bath and the cooling liquid is maintained at such a level in the bath that the pressure exerted by the liquid on the tube at the point of entry into the bath is substantially equal to the gaseous pressure maintained within the tube. Thus, when the tube is first extruded and is in an unset readily deformable state, the effective inflating pressure is substantially nil. In practice, a small positive or negative inflating pressure (for example, about ½ inch water gauge) can usually be tolerated by the unset tube without ballooning and rupture.

As the tube passes up through the bath, the tube proceeds to set and becomes more capable of withstanding greater inflating pressures without risk of rupture. At the same time, the effective inflating pressure increases due to the diminishing head of cooling liquid acting upon the tube.

Thus, the tube is first subjected to low inflating pressures corresponding to primary blow pressures which thin the molten tube and then, as the tube is cooled below its melting or softening point and enters the stretch-orientable state, the effective inflating pressure smoothly increases to the magnitude of secondary blow pressures causing stretching and orientation of the molecular structure of the tube wall in both the longitudinal and transverse directions according to the operating conditions employed.

The stretch applied to the tube in the longitudinal direction and transverse direction and the ratio of the degree of stretch in the two directions can all be adjusted by altering certain operating conditions, for example, by using cooling liquids of different densities, by altering the draw-off speed, by altering the pressure of the gaseous medium, by increasing or decreasing the diameter of the tube-forming die, by altering the height of the drawing means (for example nip rollers) above the die or by altering the temperature of the cooling liquid.

The cooling liquid may conveniently be water, glycerine or a salt solution held at a suitable temperature or a liquid metal having a melting point appreciably below the melting point of the thermoplastic polymeric material, which is maintained in a liquid state at a suitable cooling temperature by a temperature controlling means. Liquid metals have the advantages of good heat conduction to facilitate the cooling of the extruded tube, are inert and non-sticking to thermoplastic polymeric materials and present a smooth surface offering a very low frictional resistance to the advancing tube. Examples of suitable liquid metals are mercury and metal alloys such as Wood's fusible metal (4 parts by weight bismuth, 2 parts lead, 1 part tin and 1 part cadmium. M. Pt. 71° C.), Rose's metal (2 parts by weight bismuth, 1 part lead and 1 part tin. M. Pt. 93°–94° C.) or Lipowitz's alloy (15 parts by weight bismuth, 8 parts lead, 4 parts tin and 3 parts cadmium. M. Pt. 60°–65° C.), held at a suitable temperature above their melting points.

Alternatively, the cooling liquid may be a fluidised bed of particles, for example spherical particles of glass or stainless steel maintained in a fluid state by compressed air injected into the base of the bed. Such a bed acts as a liquid and the temperature of the bed may readily be controlled as required by controlling the temperature of the injected air.

The stretched oriented tube may, if desired, be heat-set by re-heating the tube to a temperature between the temperature at which the tube was inflated and stretched and the melting point or softening point of the thermoplastic polymer while maintaining within the tube in the heat-setting zone a pressure sufficient to restrain shrinkage of the film. Some shrinkage is permissible but it should be less than 30% and preferably less than 15%. If the optimum pressure to restrain shrinkage is the same as the pressure maintained by the gaseous medium in the tube, then the heat-setting treatment may conveniently be carried out on the stretched oriented tube before collapsing of the tube above the bath. If, however, the optimum pressure required within the tube is less than or more than the gaseous pressure within the tube, the tube may be reinflated to the required pressure after the collapsing rollers. The tube may be conveniently heated for heat-setting by an encircling ring of infra-red radiation lamps.

Alternatively, the stretched oriented tube may be heat-set in the slit opened-out state while being held against substantial shrinkage in a stenter.

When the film-forming composition is a coagulable liquid, the setting liquid is conveniently a coagulation liquid. For example, the film-forming composition may be viscose or hydroxyethyl cellulose in a caustic soda solution which is extruded into an acid coagulation bath. By the method in accordance with the invention, the gaseous medium maintained within the tube will stretch the tube during the coagulation step to effect orientation of the molecular structure of the tube wall without blowing out and disrupting the tubular stream of uncoagulated composition extruded from the die into the coagulation bath.

In another form of the invention, the tube is partly filled with setting liquid (other than a fluidised bed) having a level lower than the level of the setting liquid in the bath, the pressure exerted by the setting liquid in the bath upon the tube at the level of the liquid in the tube being substantially equal to the pressure of the gaseous medium within the tbe.

The liquid inside the tube promotes rapid setting of the extruded tube and substantially prevents the action of an effective inflating pressure upon the tube until the tube has passed above the column of setting liquid enclosed within the tube. This arrangement permits setting to proceed to some degree before exposing the tube to appreciable effective inflating pressures. As the tube passes through the region between the level of liquid enclosed within the tube and the level of the liquid in the bath, the effective inflating pressure increases due to the diminishing head of liquid in the bath until it becomes equal to the gaseous pressure maintained within the tube at the emergence of the tube from the bath.

The invention also includes an apparatus for the manufacture of stretched tubular film comprising a horizontal tube-forming die through which a film-forming composition may be extruded to form a tube, a tube-drawing and collapsing means placed above the die for drawing the tube from the die and collapsing the tube, an inlet means for introducing a gaseous medium under pressure into the interior of the tube to inflate and stretch the tube, a receptacle surrounding the die for holding a setting liquid for setting the film-forming composition as it is extruded from the die and passes vertically upwards through the setting liquid and a liquid level adjusting means for adjusting the level of the setting liquid in the receptacle as required in relation to the pressure of the gaseous medium.

The liquid level adjusting means may simply be a pump capable of adding or subtracting setting liquid to or from the receptacle or more preferably an open tank for the setting liquid connected to the receptacle by a flexible pipe and capable of being lifted and lowered to adjust the level of liquid in the receptacle.

In one preferred form of the apparatus, the liquid level adjusting means comprises a closed tank for the setting liquid communicating at the top with a gaseous medium supply pipe for supplying gaseous medium under pressure to the tube by way of the inlet means, and at the bottom with the bottom portion of the receptacle. On applying the gaseous medium under pressure to the tube, the setting liquid is forced out of the tank into the receptacle until the head of liquid in the receptacle over the level of liquid in the tank balances the pressure of the gaseous medium. Providing that the volume of the tank is large compared with the volume of the receptacle and before applying the gaseous medium under pressure, the level of the setting liquid is substantially at the bottom of the receptacle, then the pressure of the setting liquid in the receptacle at the point of entry of the extruded film-forming composition will be substantially equal to the pressure of the gaseous medium within the tube. This form of apparatus is not, however, suitable for use when the setting liquid is a fluidised bed.

In another preferred form of apparatus, the liquid level adjusting means comprises an open tank for the setting liquid connected to the bottom portion of the receptacle by a flexible pipe and also connected to an inlet opening in the die face within the circular die orifice for introducing setting liquid into the interor of the die. Thus, setting liquid can be supplied to the interior of the tube.

On applying the gaseous medium under pressure to the interior of the tube, the level of the setting liquid in the tube will be depressed until the head of setting liquid in the receptacle with respect to the level within the tube will exert a pressure on the tube adjacent the level of the setting liquid in the tube equivalent to the pressure exerted by the gaseous medium within the tube. The levels of the setting liquid in the tube and the receptacle may be adjusted relative to the bottom of the receptacle by lifting and lowering the open tank as may be required. This form of apparatus also is not suitable for use when the setting liquid is a fluidised bed.

In order to prevent gauge bands formed in the stretched oriented tubular film superimposing on wind-up of the flattened film and distorting the rolls by the formation of hard bands, the drawing and collapsing means or the die may be rotatable or reciprocatable, for example at a rate of one revolution per minute, about an axis substantially coincident with the axis of the cylindrical path taken by the tube so as to distribute the gauge bands across the tube, such as is described in British patent specification No. 744,977.

Figure 2:
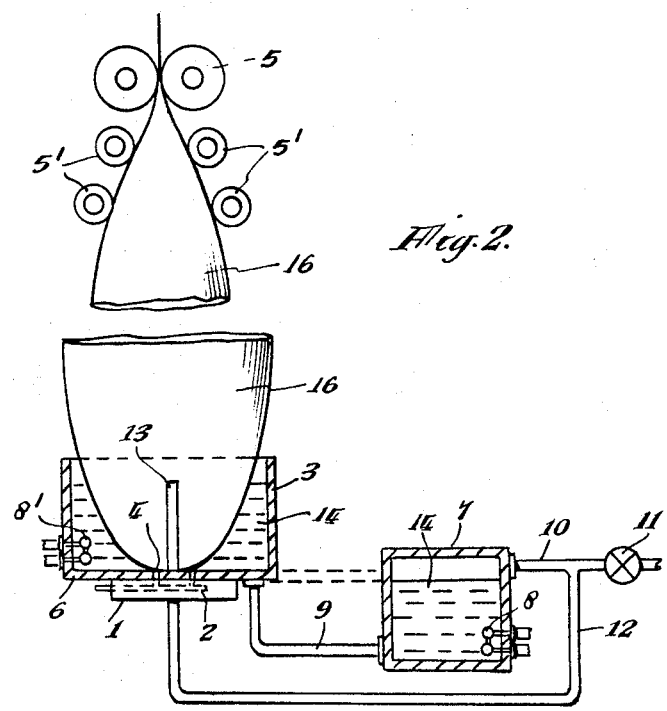
Figure 3:
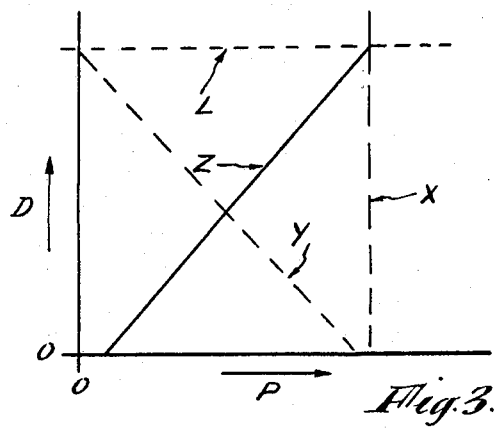
Figure 4:
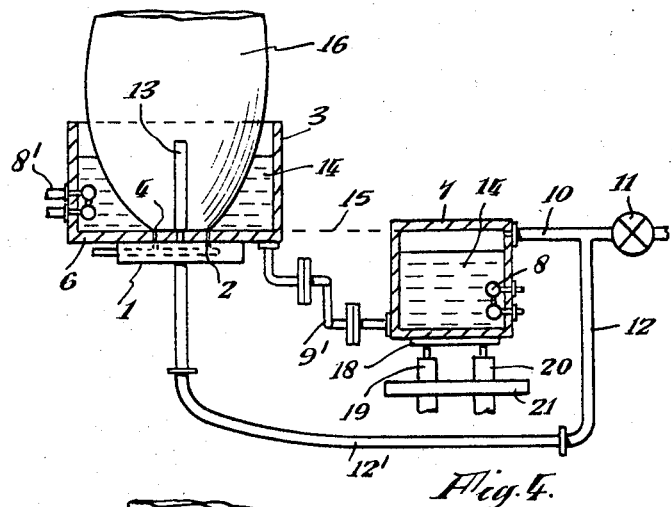
Figure 5:
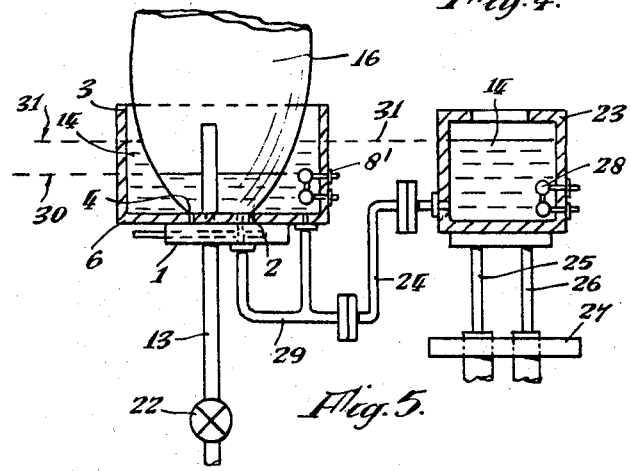
Figure 6:
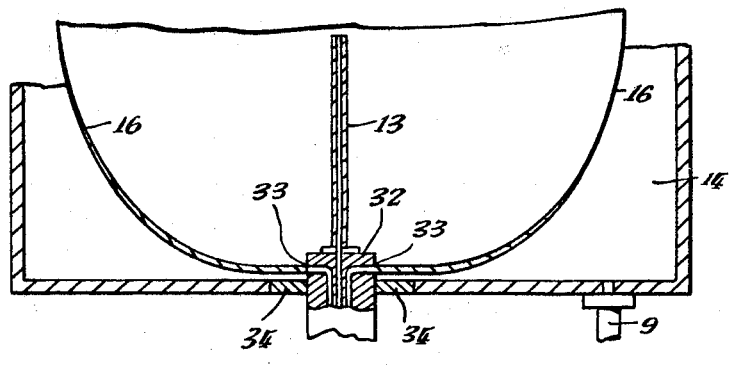
Figure 7:
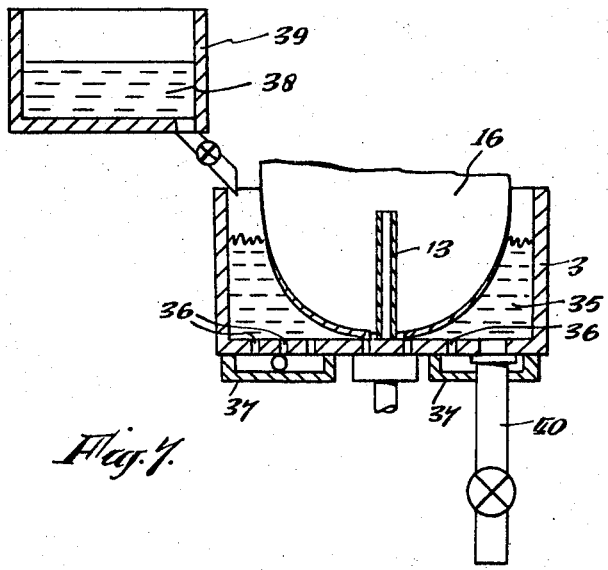

Specific examples of apparatus for producing stretched tubular film and methods for putting the invention into effect will now be described with reference to the accompanying drawings, in which, FIGURE 1 is a diagrammatic front elevation of one form of apparatus, partly in section, illustrating the setting-up procedure, FIGURE 2 is a view of the apparatus as shown in FIGURE 1 but illustrating normal operation of the apparatus, FIGURE 3 is a graph showing the relationship of the various pressures acting upon the freshly extruded tube, FIGURE 4 is a view of the apparatus as shown in FIGURE 2 but showing a modification thereto, FIGURE 5 is a diagrammatic front elevation of another form of apparatus, FIGURE 6 is an enlarged view of a part of FIGURE 2 showing a modification thereto, and FIGURE 7 is a diagrammatic front elevation of a further form of apparatus.

In FIGURE 1, a tube forming extrusion die 1 having an annular extrusion orifice 2 is fitted to the base of a receptacle 3 having an annular cut-away portion 4 through which material extruded from the die 1 passes upwardly through the receptacle 3 to a pair of nip rollers 5 placed vertically above the die 1. Between the receptacle and the nip rollers 5 are two or more pairs of collapsing rollers 5'. The base 6 of the receptacle 3 in contact with the die 1 is made of a heat-insulating material, for example a ceramic.

A closed tank 7 fitted with a heat-exchange coil 8 is connected to the bottom of the receptacle 3 by a pipe 9.

An air-pipe 10, through which air at controllable pressure may be passed from a source (not shown) through a valve 11, is connected to the top of the tank 7 and also by way of a connector 12, to an inlet pipe 13 which passes through the centre of the die 1, the base 6 of the receptacle 3 and terminates near the top of the receptacle 3. The receptacle 3 is also fitted with a heat-exchange coil 8'.

Referring particularly to FIGURE 1, the apparatus may be set up to produce a biaxially oriented tubular film of a thermoplastic polymeric material, for example isotactic polypropylene, as follows:

The tank 7 is nearly filled with a liquid metal alloy 14 which has a melting point appreciably below the melting point of the thermoplastic material. The metal alloy 14 is maintained in the liquid state but at a temperature within the temperature range at which the thermoplastic material is in a stretch-orientable state by a fluid pumped through the heat-exchange coil 8.

The tank 7 is positioned such that the level of the metal alloy 14 in the pipe 9 is at the junction of the pipe 9 and the bottom of the receptacle 3 as indicated by the broken line 15. The thermoplastic material is then extruded in a hot molten state through the annular orifice 2 in the die 1 to form a flaccid tube 16 which cools and solidifies in the surrounding atmosphere and is drawn up by and flattened between the nip rollers 5.

The valve 11 is then opened admitting air under pressure through the air pipe 10, connector 12 and inlet pipe 13 to that part of the advancing tube 16 which is passing between the die 1 and the nip rollers 5 causing the tube 16 to become inflated. The pressure of the air is sufficient to inflate and stretch the tube when it is in a stretch-orientable state below its melting point. At the same time the air is admitted through the air-pipe 10 to the top of the tank 7 causing the metal alloy 14 to be forced into the receptacle 3 around the tube 16.

As the metal alloy 14 is of a temperature appreciably lower than the solidification point of the thermoplastic material, the tube 16 rapidly proceeds to solidification.

Referring to FIGURE 2, a point is eventually reached when the desired degree of inflation and stretching of the tube wall is achieved and the valve 11 is closed. The tank 7 is of such a capacity that the level of metal alloy 14 in the tank falls to a level (shown by a broken line 17) which is only a small fall below line 15. Thus, the pressure of the metal alloy 14 exerted upon the tube 16 at the bottom of the receptacle 3 is substantially equal to the air pressure maintained within the tube 16 since it is the air pressure in the air pipe 10 which maintains the difference in levels between the metal alloy 14 in the receptacle 3 and the tank 7. Thus, when the tube 16 first meets the cooling metal alloy 14, the resultant internal pressure upon the tube 16 is negligible. However, since the pressure exerted upon the tube 16 by the metal alloy 14 decreases as the tube 16 passes up through the receptacle 3 while the internal air pressure remains constant, the effective inflating pressure rises from nearly zero to the pressure of the air within the tube during the passage of the tube 16 through the metal alloy 14. This is shown in graph marked FIGURE 3 in which the vertical distance D of the tube 16 from the bottom of the receptacle 3 is plotted vertically and pressures P are plotted horizontally. The line L marks the level of the metal alloy 14 in the receptacle 3. The line X represents the air pressure maintained within the tube 16, the line Y represents the pressure applied to the exterior of the tube 16 by the metal alloy 14 and the line Z represents the resultant effective inflating pressure which brings about the inflation and stretching of the tube 16.

It will be seen that owing to the fall in level of metal alloy 14 in tank 7 from level 15 to level 17, the pressure Y exerted by the alloy 14 at the bottom of the receptacle is slightly less than the pressure of the gaseous medium within the tube so that at this point the effective inflating pressure Z is slightly positive.

Since the effective inflating pressure increases as the tube 16 passes upwardly through the metal alloy 14, the tube 16 is first inflated gently and thinned as solidification proceeds. When the tube 16 has cooled to a temperature below its melting point and at which the tube is molecularly oriented on stretching, the effective inflating pressure is sufficiently strong to stretch the tube 16 and effect orientation. The orientation will take place in the transverse direction and the longitudinal direction to a degree depending upon the conditions including the rate of draw by the nip rollers 5, and the temperature and depth of the metal alloy 14 in the receptacle 3.

The inflated stretched tube 16 is gradually flattened between the collapsing rollers 5' and finally collapsed between the nip rollers 5. It is then wound up by a winding means (not shown) into a storage roll (not shown). If any of the air trapped within the tube 16 should escape through the nip rollers, then the pressure can be restored from time to time by admitting more air through the valve 11. It will be seen that the system is self-balancing. If the air pressure fluctuates the head of metal alloy 14 in the receptacle 3 it will also fluctuate such that the effective inflating pressure at the point of entry of the tube 16 into the receptacle 3 remains substantially zero. If by any mischance the inflated tube is ruptured, then the air pressure in tank 7 will fall to atmosphere and the metal alloy 14 in the receptacle 3 will return to the tank 7 by way of the pipe 9.

The temperature of the metal alloy 14 in the receptacle 3 is maintained at a suitable level by circulating a suitable fluid through the heat-exchange coil 8'.

The apparatus shown in FIGURE 4 is similar to that illustrated in FIGURE 2 except that the tank 7 is mounted on a platform 18 capable of vertical movement by the action of hydraulic jacks 19, 20 mounted in a fixed frame 21. The tank 7 is connected to the receptacle 3 by a pivotable pipe 9' and the air pipe 10 is connected to the inlet pipe 13 by a flexible connector 12'.

By these means, the level of the metal alloy 14 in the tank 7 can be adjusted as required with respect to the bottom of the receptacle 3 (indicated by the dotted line 15) to adjust the effective inflating pressure acting upon the tube 16, particularly at the point of entry into the receptacle 3.

In FIGURE 5, as in FIGURES 1 and 2, a film-forming thermoplastic polyureric composition in a hot molten state is extruded through a die 1 into a receptacle 3 containing a molten alloy 14 held at such a temperature that the thermoplastic composition is cooled below its melting point to form a tube 16 which is drawn away and collapsed between nip rollers (not shown). The tube 16 is inflated and stretched by a bubble of air maintained under pressure in the tube 16 between the die 1 and the collapsing means. The air is initially introduced into the tube 16 through the inlet pipe 13 from a pressure source by way of a valve 22 and additional air may be added from time to time to make up any air lost past the nip rollers (not shown) which collapse the tube 16.

The level of the molten alloy 14 in the receptacle 3 is maintained at any desired level by a header tank 23 connected to the receptacle by a movable jointed feed pipe 24 and capable of being lifted and lowered by hydraulic jacks 25, 26 mounted in a fixed frame 27. The molten alloy 14 is maintained at the required temperature by a heat-exchange coil 28. Molten alloy 14 is also introduced into the interior of the tube 16 by means of a further feed pipe 29 connected to the pipe 24 and passing through the centre of the die 1, and the base 6 of the receptacle 3.

At start up, when there is no air pressure applied to the tube 16, the levels of molten alloy 14 inside the tube 16, the receptacle 3 and the tank 23 are substantially the same. However, when the tube 16 is inflated by air under pressure introduced through the pipe 13, the level of the alloy 14 in the tube 16 will be depressed as shown by broken line 30 in relation to the levels in the receptacle 3 and the header tank 23, as shown by broken line 31, which always move together. The pressure exerted by the head of molten alloy 14 in the receptacle 3 upon the tube 16 at the level of the alloy 14 within the tube 16 (line 30) is equal to the air pressure maintained within the tube 16. Thus the effective inflating pressure at this point is substantially nil. However, the effective inflating pressure rises as the tube 16 advances through the alloy 14 in the bath due to the diminishing head and thus diminishing pressure, of alloy 14 upon the outside of the tube 16 until at the point of emergence of the tube 16 from the bath at 31, the effective inflating pressure is equal to the air pressure within the tube 16.

The alloy 14 within the tube 16 facilitates the cooling of the extruded thermoplastic material and since there is no effective inflating pressure within the portion of the tube 16 occupied by the alloy 14 it is possible to adjust the position at which the effective inflating pressure first becomes operative by adjusting the level of alloy 14 inside the tube 16. This allows for an extended period for the setting of the thermoplastic material, if required, before the effective inflating pressure becomes significant. The level of alloy 14 in the tube 16 may be adjusted either by adjusting the air pressure within the tube 16—which will alter the difference in levels of alloy 14 inside and outside of the tube 16 shown at 30 and 31—or by adjusting the height of the header tank 23—when the difference in levels of alloy 14 at 30 and 31 will remain the same.

The apparatus of FIGURE 5 may be used in other ways. For example, the alloy 14 may be drained from both the receptacle 3 and tube 16 by lowering the header tank 23 to a sufficient extent when the apparatus may be operated as a conventional apparatus for the production of tubular film from thermoplastic materials. Alternatively, the header tank 23 may be lifted to such a degree that the molten alloy 14 in the tube 16, when air pressure has been applied to the tube 16, is on a level with the bottom of the receptacle 3 and the apparatus may then be operated as described above wih reference to the apparatus illustrated in FIGURES 1 and 2. In setting up the apparatus to manufacture stretched oriented tubular films, there is no necessity to avoid alloy 14 geting into the first extruded portion of the tube 16 and, in fact, the initial open-ended portion of the tube 16 can be extruded directly through the bath of alloy 14.

FIGURE 6 shows an alternative tube forming die 32 which protrudes into the receptacle 3 and has a circular orifice 33 which opens from the side of the die 32. The die 32 has the advantage that the flow of thermoplastic material from the orifice 33 is substantially in the same direction as the freshly formed tube 16 is caused to follow. The body of the die 32 is thermally insulated from the receptacle 3 by an insulating plug 34.

In FIGURE 7, the setting liquid in the receptacle 3 consists of a fluidised bed 35 of spherical glass particles about 0.1 mm. in diameter kept in a state of agitation by compressed air injected into the base of the receptacle 3 at openings 36 from a supply channel 37. The bed 35 in a fluid state acts like a liquid. The temperature of the compressed air is selected to maintain the fluidised bed 35 at a suitable temperature for the cooling of the extruded tube 16. The level of the fluidised bed 35 in the receptacle 3 may be controlled by either adding glass particles 38 from a reservoir tank 39 or removing glass particles 38 from the bed 35 by outlet pipe 40 at the bottom of the receptacle 3. The level of the bed 35 may also be varied over close limits by varying the rate of injection of compressed air into the bed 35 when the volume of the bed 35 is varied.

What I claim and desire to secure by Letters Patent is:

1. A method for the production of a stretched oriented tubular film of an orientable polymeric material, comprising: extruding a film-forming composition capable of forming a film of the polymeric material on setting, through a tube-shaping die while in the unset state into a bath of setting liquid to form a tube, drawing the tube upwardly through the setting liquid by a drawing means, setting the tube to a stretch-orientable state within the bath in a region disposed above the die, maintaining a gaseous medium under pressure within the tube passing through the bath at a pressure sufficient to inflate and stretch the tube while it is undergoing setting and to inflate and stretch the tube in the stretch-orientable state to form a stretched oriented tube, and maintaining the setting liquid in the bath at such a level that the effective inflating pressure, being the differential pressure between the internal pressure exerted within the tube and the external pressure exerted by the setting liquid, acting upon the tube in the freshly extruded unset state is insufficient to rupture the tube.

2. A method as claimed in claim 1 in which the setting liquid in the bath is maintained at such a level that at the point of extrusion of the film-forming composition into the bath the pressure of the setting liquid upon the tube is substantially equal to the internal pressure within the tube.

3. A method as claimed in claim 1 in which the tube is partly filled with setting liquid having a level lower than the level of the setting liquid in the bath, the pressure exerted by the setting liquid in the bath upon the tube at the level of the liquid in the tube being substantially equal to the pressure of the gaseous medium within the tube.

4. A method as claimed in claim 1 in which the tube is entirely filled with gaseous medium under pressure.

5. A method as claimed in claim 4 in which the orientable polymeric material is a thermoplastic polymer and the setting liquid is a cooling fluidised bed.

6. A method as claimed in claim 5 in which the fluidised bed comprises spherical particles of a material selected from the group consisting of glass and stainless steel and is maintained in a fluid state by compressed air.

7. A method as claimed in claim 1 in which the film-forming composition is a coagulable liquid and the setting liquid is a coagulation liquid.

8. A method as claimed in claim 7 in which the film-forming composition is viscose and the setting liquid is an acid coagulation liquid.

9. A method as claimed in claim 1 in which the die and the drawings means are angularly moved relative to each other about an axis co-incident with the axis of the tube so as to distribute gauge bands about the tube.

10. A method as claimed in claim 1 in which the orientable polymeric material is a thermoplastic polymer and the setting liquid is a cooling liquid.

11. A method as claimed in claim 10 in which the thermoplastic polymer is selected from the group consisting of polyethylene, polypropylene, polybutene-1, polyvinyl chloride, cellulose acetate and polyethylene terephthalate.

12. A method as claimed in claim 10 in which the stretched oriented tubular film is heat-set by heating the film to a temperature between the temperature at which the tube was inflated and stretched and the melting point or softening point of the thermoplastic polymer while maintaining within the tube in the heat-setting zone a pressure sufficient to restrain shrinkage of the film.

13. A method as claimed in claim 10 in which the cooling liquid is a metal maintained in a liquid state.

14. A method as claimed in claim 13 in which the metal is selected from one of the group consisting of mercury; a fusible alloy consisting of 4 parts by weight bismuth, 2 parts lead, 1 part tin, and 1 part cadmium; a fusible alloy consisting of 2 parts by weight bismuth, 1 part lead, and 1 part tin; and a fusible alloy consisting of 15 parts by weight bismuth, 8 parts lead, 4 parts tin, and 3 parts cadmium.

15. Apparatus for the manufacture of stretched oriented tubular film comprising a horizontal tube-forming die through which a film-forming composition is extruded to form a tube, a tube-drawing and collapsing means positioned above said die for drawing the tube from said die and collapsing said tube, a gas inlet means for introducing a gaseous medium under pressure into the interior of the tube to inflate and stretch the tube, a receptacle surrounding the die for holding a setting liquid for setting the film-forming composition as it is extruded from the die and passes vertically upwardly through the setting liquid, an open tank for the setting liquid, a first and second fluid inlet opening, said first fluid inlet opening being provided in the die face and communicating with the interior of said tube, said second fluid inlet opening being positioned in the bottom of said receptacle and spaced from said die, connecting means coupling said first and second fluid inlet openings to said tank, said tank being movable vertically with respect to the receptacle to adjust the level of the fluid column in said receptacle, thereby to control the gradient of interior pressure applied to said tube, said first and second fluid inlet means being simultaneously provided with fluid from said tank to substantially balance out any net interior pressure at the position of said extrusion die.

16. An apparatus for the manufacture of stretched oriented tubular film comprising a horizontal tube-forming die through which a film-forming composition may be extruded to form a tube, a tube-drawing and collapsing means placed above the die for drawing the tube from the die and collapsing the tube, an inlet means for introducing a gaseous medium under pressure into the interior of the tube to inflate and stretch the tube, a receptacle surrounding the die for holding a setting liquid for setting the film-forming composition as it is extruded from the die and passes vertically upwards through the setting liquid, and means for adjusting the level of said setting liquid in said receptacle to substantially balance out the interior pressure applied by said gaseous medium at said extrusion die, said liquid level adjusting means comprising a closed tank for holding a supply of said setting liquid, means coupling the bottom of said tank to the bottom of said receptacle in liquid transfer relationship, and means coupling the top of said tank to said gaseous inlet means to simultaneously apply the pressure of said gaseous medium to the top of the liquid contained within said closed tank and to said inlet means, said tank being positioned at an elevation relative to said receptacle such that the level of the bottom of the receptacle and the surface of setting liquid in the tank are disposed substantially in the same horizontal plane.

References Cited

UNITED STATES PATENTS

| | | | |
|---|---|---|---|
| 2,688,773 | 9/1954 | McIntire | 264—95 |
| 2,838,800 | 6/1958 | Mertz | 264—178 |
| 2,844,846 | 7/1958 | Kronholm | 18—14 |
| 2,987,776 | 6/1961 | Miller et al. | 264—95 X |
| 3,052,989 | 9/1962 | Doleman. | |
| 3,105,269 | 10/1963 | Sevbert | 18—14 |
| 3,121,761 | 2/1964 | Osborn | 264—95 |
| 3,212,134 | 10/1965 | Yokana | 18—14 |
| 3,242,528 | 3/1966 | Elder | 264—176 |
| 3,013,311 | 12/1961 | Meissner | 264—95 X |
| 3,121,760 | 2/1964 | Kline | 264—88 X |

FOREIGN PATENTS 144,554    4/1931    Switzerland.

OTHER REFERENCES

Chemical Engineers' Handbook, third ed., N. Y., McGraw Hill, 1950, page 454. TP 155. P4. 1950.

ROBERT F. WHITE, *Primary Examiner.*

A. R. NOE, *Assistant Examiner.*